United States Patent Office 2,707,696
Patented May 3, 1955

2,707,696
ANTIHISTAMINIC COMPOSITIONS

Howard Edward Worne, Merchantville, N. J., assignor to The Robinson Foundation, Inc., New York, N. Y., a corporation of Delaware No Drawing. Application June 30, 1951,
Serial No. 234,653

12 Claims. (Cl. 167—65)

This invention relates to compositions of matter useful in treating conditions due to or complicated by allergic reactions. More particularly, it relates to compositions of this type which contain a histamine antagonist. It is known that some types of allergies do not show the desired degree of response to antihistaminic materials now in use. It has also been realized that the usefulness of otherwise effective antihistaminic drugs is limited by side reactions or toxic manifestations, of which sedation, dizziness, disturbed coordination, excitability, palpitation, and blood dyscrasias may be cited as merely illustrative. An important object of the present invention is to provide a composition including an antihistaminic material of conventional type, comprising an organic basic substance or a salt thereof, and also including a second type of component which greatly enhances the effectiveness of the antihistaminic component while suppressing side reactions due thereto.

The therapeutic compositions of the invention comprise an antihistaminic organic basic substance or a salt thereof in association with a metal ascorbate. Sodium ascorbate and calcium ascorbate have been found most effective, the sodium salt being preferred. Potassium ascorbate has also been found effective, but it is less preferred and, indeed, its use is contraindicated in cases where an unduly high potassium blood level has been found.

The invention can be practiced with various amine type antihistaminic materials, of which the substituted ethylamine, the substituted ethylenediamine and the cyclic amine types (including the halogenated analogs) and their salts are the best known. Among the compounds which have been used are:

Chlorcyclizine: N - methyl-N'-(4-chlorobenzhydryl)-piperazine
Chloroprophenpyridamine: 1 - (p - chlorophenyl)-1-(2-pyridyl)-3-dimethylaminopropane
Diphenhydramine: 2-benzhydryloxy-N,N-dimethyl-ethylamine
Methapyrilene: N,N-dimethyl-N'-phenyl-N'-(2-thenyl)-ethylenediamine
Phenindamine: 2 - methyl-9-phenyl-2,3,4,9-tetrahydro-1-pyridindene
Prophenpyridamine: 1-phenyl-1-(2-pyridyl)-3-dimethylaminopropane
Pyranisamine: N,N-dimethyl-N'-(p-methoxybenzyl)-N'-(2-pyridyl)-ethylenediamine
Thonzylamine: N,N-dimethyl-N'-(p-methoxybenzyl)-N'-(2-pyrimidyl)-ethylenediamine
Tripelennamine: N,N-dimethyl-N'-benzyl-N'-(2-pyridyl)-ethylenediamine These can be employed in the form of the free base (e. g. as in the case of prophenpyridamine), but ordinarily it is preferred to employ a salt thereof, such as the hydrochloride, the sulfate, the phosphate, the maleate, the tartrate, and the like salts. When using calcium ascorbate, it is advisable to avoid the use of antihistaminic salts (for example, sulfate or oxalate salts) containing anions which yield a difficultly soluble calcium salt.

The relative amounts of antihistaminic material and metal ascorbate influence the therapeutic effectiveness of the compositions of the invention. It has been found that, for best results, the weight of metal ascorbate in the composition should be two or more times the weight of the antihistaminic material. In one embodiment, the compositions of the invention comprise, in each dose, from about 25 to about 50 mg. of antihistaminic material and from about 100 to about 250 mg. of metal ascorbate. In the treatment of infants, it may be desirable to use a smaller dose, for example, about 10 mg. of antihistaminic material. Likewise, when using a highly active antihistaminic compound such as chloroprophenpyridamine, it may be advisable to decrease the dosage to conventional levels, for example, about 4 mg. for an adult, or about 2 mg. for a child. In such cases, it will be understood that the proportion of metal ascorbate can be decreased if desired. However, this is not mandatory. In particular cases, the proportion of metal ascorbate : antihistaminic compound can be increased over 2:1 if desired, the upper limit being dictated only by the tolerance of the patient to the ascorbate salt. Also, although it is recommended to use the metal ascorbate in an amount not less than twice that of the antihistaminic material, it will be understood that compositions embodying minor deviations from this lower limit which still retain the effectiveness characteristic of the invention are not excluded from the invention.

The compositions of the invention can be prepared for administration in various forms. A convenient dosage form is obtained by merely mixing the antihistaminic material with the metal ascorbate and enclosing each dose in a hard shell gelatin capsule. A capsule containing 25 mg. of phenindamine hydrogen tartrate admixed with 100 mg. of sodium ascorbate is illustrative of such an embodiment of the invention. The compositions of the invention can also be incorporated in tablets, with suitable excipients, lubricants, and coating materials; or in ampul solutions or in syrups or in other liquid vehicles; in such manner as will be obvious to those skilled in the art. It will also be understood that other therapeutically active materials, e. g. vitamins, antipyretics, and the like, may be included in the compositions of the invention for their added therapeutic effects. In particular, in antihistaminic therapy, the incorporation of thiamine salts and of riboflavin and its salts is often advisable.

The invention includes compositions containing more than one antihistaminic material or more than one metal ascorbate; e. g. a composition in dosage form, containing in each dose 4 mg. of chloroprophenpyridamine maleate, 10 mg. of N-(2'-dimethylamino-2'-methylethyl)-phenothiazine hydrochloride, 50 mg. of sodium ascorbate and 50 mg. of calcium ascorbate, is included in the invention.

I claim:

1. A therapeutic composition which comprises an antihistaminic material selected from the group consisting of chlorcyclizine, chloroprophenpyridamine, diphenhydramine, methapyrilene, phenindamine, prophenpyridamine, pyranisamine, thonxylamine, tripelennamine, and their salts, with at least about twice the weight thereof of a metal ascorbate selected from the group consisting of sodium ascorbate, calcium ascorbate and potassium ascorbate.

2. A composition according to claim 1 in dosage form in which each dose comprises from about 25 mg. to about 50 mg. of antihistaminic material and from about 100 mg. to about 250 mg. of metal ascorbate.

3. A therapeutic composition which comprises at least one water-soluble antihistaminic salt selected from the group consisting of salts of chlorcyclizine, chlorophenpyridamine, diphenhydramine, methapyrilene, phenindamine, prophenpyridamine, pyranisamine, thonzylamine, and tripelennamine, and at least one metal ascorbate selected from the group consisting of sodium ascorbate, calcium ascorbate and potassium ascorbate, the antihistaminic salt portion being present in not more than about half the weight of the metal ascorbate portion.

4. A composition according to claim 2 in which the metal ascorbate is calcium ascorbate.

5. A composition according to claim 3 in dosage form in which each dose comprises from about 25 mg. to about 50 mg. of antihistaminic material and from about 100 mg. to about 250 mg. of metal ascorbate.

6. A therapeutic composition which comprises a water-soluble salt of diphenhydramine and at least about twice its weight of a metal ascorbate selected from the group consisting of sodium ascorbate, calcium ascorbate and potassium ascorbate.

7. A therapeutic composition which comprises a water-soluble salt of phenindamine and at least about twice its weight of a metal ascorbate selected from the group consisting of sodium ascorbate, calcium ascorbate and potassium ascorbate.

8. A therapeutic composition which comprises a water-soluble salt of thonzylamine and at least about twice its weight of a metal ascorbate selected from the group consisting of sodium ascorbate, calcium ascorbate and potassium ascorbate.

9. A therapeutic composition which comprises a water-soluble salt of tripelennamine and at least about twice its weight of a metal ascorbate selected from the group consisting of sodium ascorbate, calcium ascorbate and potassium ascorbate.

10. A therapeutic composition which comprises sodium ascorbate and not more than about one-half its weight of an antihistaminic material selected from the group consisting of chlorcyclizine, chloroprophenpyridamine, diphenhydramine, methapyrilene, phenindamine, prophenpyridamine, pyranisamine, thonzylamine, tripelennamine and salts thereof.

11. A composition according to claim 1 in which the metal ascorbate is potassium ascorbate.

12. A composition according to claim 1 in which the metal ascorbate is calcium ascorbate.

References Cited in the file of this patent

UNITED STATES PATENTS

| | | |
|---|---|---|
| 2,283,817 | Martin et al. | May 19, 1942 |
| 2,434,625 | Ruskin | Jan. 13, 1948 |
| 2,442,461 | Karrer | June 1, 1948 |

OTHER REFERENCES

J. A. P. A. Prac. Pharm. Ed., pp. 72, 74, February 1950.

Holmes: Science, November 27, 1942, vol. 96, No. 2500, pp. 497–499.

Ruskin: Science, May 9, 1947, pp. 504–505.

Idson: Chemical Industries Week, March 31, 1951, pp. 14–16.

J. A. P. A. Prac. Pharm. Ed., July 1950, vol. 21, No. 7, p. 398.